Sept. 22, 1931.  R. B. BRENNEMAN ET AL  1,824,033
WHEEL PULLER
Filed June 11, 1929
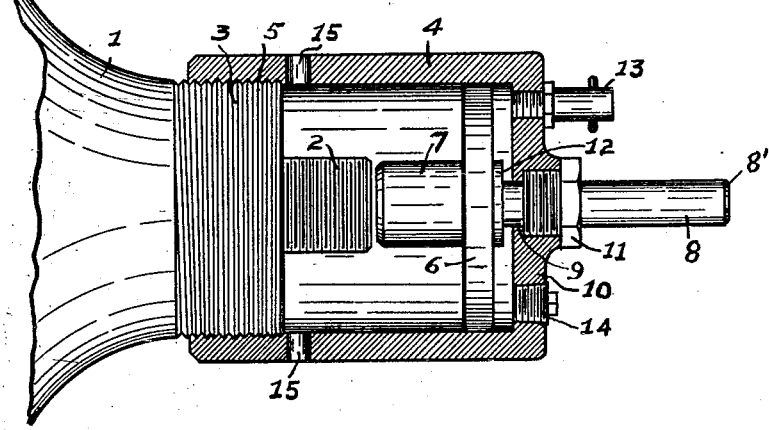
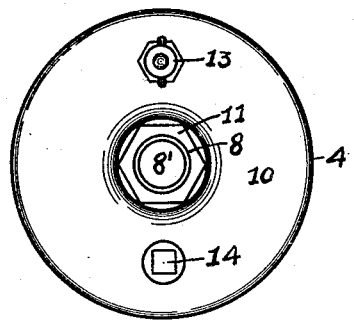
INVENTORS
Rexford B. Brenneman
William H. Monaghan
By Jack Snyder
Attorney Patented Sept. 22, 1931

1,824,033

UNITED STATES PATENT OFFICE

REXFORD B. BRENNEMAN AND WILLIAM H. MONAGHAN, OF PITTSBURGH, PENNSYLVANIA

WHEEL PULLER

Application filed June 11, 1929. Serial No. 369,967.

This invention relates to certain new and useful improvements in wheel pullers, and important objects thereof are to provide a device of the character described which is fluid operated, which comprises relatively few parts, which is simple in its construction and arrangement, strong, durable and efficient in its use, positive in its action, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings wherein like numerals of reference designate corresponding parts throughout the several views:—

Figure 1 is a cross sectional view of a wheel puller, constructed in accordance with the invention and illustrating its adaptation to a motor vehicle wheel hub.

Figure 2 is an outer end view thereof.

Referring in detail to the drawings 1 and 2 respectively denote a motor vehicle wheel hub and projecting axle of conventional construction. The hub 1 is provided with an exteriorly threaded outer end 3 for the threaded engagement of the hub cap in the usual manner.

The present invention comprises a cylindrical, cup-shaped, hollow body portion 4, which is open at its inner end and closed at its outer end. The inner open end of the body portion 4 is internally threaded, as at 5, to permit of the connection of the body portion 4 with the threaded end 3, of the hub 1.

A piston 6 is shiftably mounted in the body portion 1, and carries an inwardly extending push bar 7 and an outwardly extending guide stem 8. The push bar 7 and the guide stem 8 are longitudinally aligned, relatively to each other, and are preferably formed integral with the piston 6, at the diametric center of the latter.

A push bar 7 is adapted for abutting against the axle 2 for securing the latter when pulling the vehicle wheel. The diameter of the push bar 7 is preferably less than the diameter of the end of the axle 2 against which it abuts, thereby allowing the push bar 7 to enter the axle aperture in the wheel hub 1 to establish a pulling action of greater length.

The guide stem 8 is formed with a beveled outer end 8' and extends and projects through an aperture 9, which is provided therefor in the end wall 10 of the body portion 4. The guide stem 8 maintains the piston 6 in proper alignment in the body portion 4. The outer portion of the aperture 9 is enlarged and threaded for the reception and engagement of a packing nut 11, which surrounds the guide stem 8 and prevents potential leakage through the aperture 9 while permitting of the movement of the guide stem 8 in the latter.

The inner end of the guide stem 8 is provided with a short, enlarged shoulder 12 to prevent the close-contacting engagement of the piston 6 with the inner surface of the body portion end wall 10, to facilitate the initial distribution of the operating fluid within the body portion 4.

A check valve 13 is mounted in the body portion end wall 10 and is adapted for detachably connecting a fluid force pump therewith. The check valve 13 embodied in the disclosure in the drawings consists of an ordinary alemite fitting, which is admirably adaptable for the purpose required.

The body portion end wall 10 is provided with a drain plug 14 for draining the fluid from the body portion 1 after each wheel pulling operation. The body portion 1 is provided with air vents 15, which are disposed adjacent to the threaded end portion thereof. The vents 15 also serve as wrench holes for the engagement of a pin wrench in securing the body portion 4 to the vehicle hub 1 or when effecting its release from the latter.

The operating medium used for operating the wheel puller is preferably heavy oil, but it is obvious that any other suitable fluid or even grease may be successfully employed for the purpose set forth.

In practice, the operation of the present invention is as follows:—The body portion 4 is connected to the threaded end 3 of the wheel hub 1 with all associated parts thereof in the relative positions shown in Figure 1. A fluid force pump is connected to the check valve 13 and operated to force the fluid through the latter into the body portion 4 between the piston 6 and the end wall 10. As the fluid is forced into the body portion 4, the piston 6 will be forced inwardly until the push bar 7 engages the axle 2. The body portion 4 will then exert a pulling action drawing the vehicle hub 1 from the axle 2. After the pulling operation the body portion 4 is unscrewed from the hub 1 and the fluid is drained therefrom by the removal of the drain plug 14.

If the axle 2 should be exceptionally tight in the hub 1, a blow on the beveled end 8', of the guide stem 8, will invariably jar the axle loose to successfully effect the wheel pulling operation in the manner stated.

The present invention provides a most efficient and powerful device of its kind, that will greatly facilitate and expedite wheel pulling operations.

What we claim is:

In combination, a fluid operated wheel puller comprising a cylindrical hollow body portion, an end wall closing the outer end of said body portion, said body portion having an internally threaded inner end for threadedly connecting said body portion to the wheel hub, a piston shiftably mounted in said body portion, a push bar being formed integral with and disposed at the axial center of the inner side of said piston for engaging the outer end of the wheel axle, the diameter of said push bar being less than the diameter of the outer end of the wheel axle, a guide stem being formed integral with and disposed at the axial center of the outer side of said piston and projecting through said end wall, an automatically operable fluid inlet valve being mounted in said end wall and communicating with the interior of said hollow body portion, said body portion being formed with air vents disposed adjacent to the inner end thereof, said air vents constituting wrench holes facilitating the connection of said body portion to and the release of the latter from the wheel hub, means carried by said end wall for draining the fluid from said body portion, and a shoulder being formed on the inner end of said guide stem for preventing the engagment of said piston with said end wall, substantially as described and for the purpose set forth.

In testimony whereof we affix our signatures.

REXFORD B. BRENNEMAN.
WILLIAM H. MONAGHAN.